Nov. 18, 1952  R. M. MAGNUSON  2,618,131
QUICK FREEZE APPARATUS AND PACKAGE
Filed May 3, 1947  2 SHEETS—SHEET 1

INVENTOR
Roy M. Magnuson
BY Harper Allen
ATTORNEY

Nov. 18, 1952  R. M. MAGNUSON  2,618,131
QUICK FREEZE APPARATUS AND PACKAGE
Filed May 3, 1947  2 SHEETS—SHEET 2

INVENTOR
ROY M. MAGNUSON
BY Harper Allen
ATTORNEY

Patented Nov. 18, 1952

2,618,131

UNITED STATES PATENT OFFICE 2,618,131

QUICK FREEZE APPARATUS AND PACKAGE

Roy M. Magnuson, Campbell, Calif., assignor of one-third to George H. Ballantyne, San Jose, Calif., and one-third to Cassius L. Kirk, Bozeman, Mont.

Application May 3, 1947, Serial No. 745,689

4 Claims. (Cl. 62—114)

This invention relates to the art of frozen foods and is concerned more particularly with the provision of improved quick freeze apparatus and an improved frozen product.

It is a general object of the invention to provide a quick freeze apparatus and a frozen food product of a character to enhance the freezing operation of the product and also to provide for use of the frozen product in separate portions.

A further object of the invention is to provide a frozen food product in which a plurality of food portions in a package can be separated for individual use if desired.

Another object of the invention is to provide an apparatus and product of the above character which will enable rapid freezing of the product.

Other objects and advantages of the invention will be apparent from the following description of a preferred embodiment thereof, as illustrated in the accompanying drawings, in which.

Figure 1:
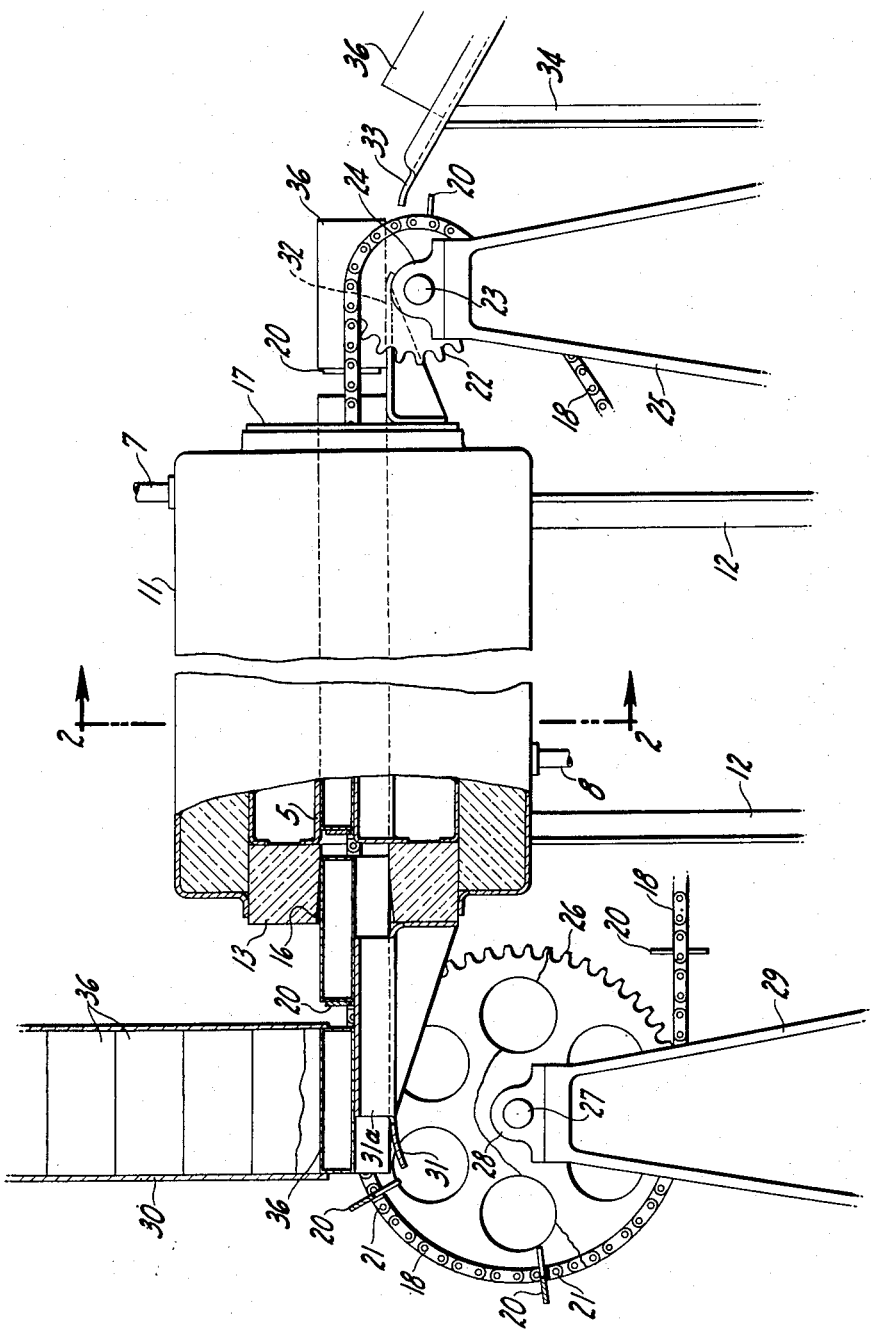
Figure 1 is a side elevational view, partially in section, of quick freeze apparatus embodying the instant invention.

Referring to the drawings, the apparatus includes a quick freeze tube or tunnel 5 of rectangular cross-section formed of four refrigerating walls or surfaces which form the inner walls of a refrigerant chamber 6 that completely surrounds the fluid-tight walls of the tunnel. The structure of the tunnel or tube 5 is described in greater detail hereinafter. A suitable refrigerant such as brine is supplied to the chamber 6 through an inlet pipe 7 and is withdrawn through an outlet pipe 8, which with the chamber 6 form part of a refrigerant circulating or cycling system including a brine refrigerating machine (not shown). The refrigerant chamber 6 is, in turn, surrounded by a suitable layer of insulating material 9 contained within a casing 11 supported by legs or standards 12.

At the feed end of the tunnel 5, a block of insulating material 13 is provided having a flared entrant opening 16 to the tunnel 5, and a similar apertured block 17 is provided at the discharge end.

In order to progress the packages of food through the freezing tunnel, an endless conveyor is provided including a pair of spaced apart chains 18 engaging in respective longitudinal recesses or tracks 19 formed in the side walls of the tunnel 5. A series of progressors or impellers 20 are secured in spaced relation between the chains 18 by brackets 21, the spacing between the progressors corresponding to one or more lengthwise dimensions of the packages of the food. As shown, the progressors 20 are spaced apart to receive one package between each adjacent pair of progressors.

The respective chains 18 engage similar drive sprockets 22 carried by a drive shaft 23 which is journalled in suitable bearings 24 carried by respective supporting standards 25. The drive shaft 23 may be connected in any suitable manner to a source of power, such as an electric motor (not shown). At the feed end of the apparatus, the chains 18 engage a pair of idler sprockets 26 which are secured on a shaft 27 also journalled in suitable bearings 28 carried by respective standards 29.

To feed packages to the conveyor for progression through the tunnel, a feed hopper 30 is provided which contains a stack of packages, the bottom package of which rests upon a feed ramp 31 for engagement by a progressor 20, so that by maintaining a stack of food packages within the hopper 30 an automatic gravity feed of the packages to the conveyor is insured. At the discharge end of the tunnel a discharge ramp 32 is provided leading to a discharge chute 33 supported by suitable standards 34. The structure described above is of the general character disclosed and claimed in the copending application of Cassius L. Kirk, Serial No. 603,715, filed July 7, 1945 for Quick Freeze Method and Apparatus, now Patent No. 2,563,938, issued August 14, 1951.

Figure 3:
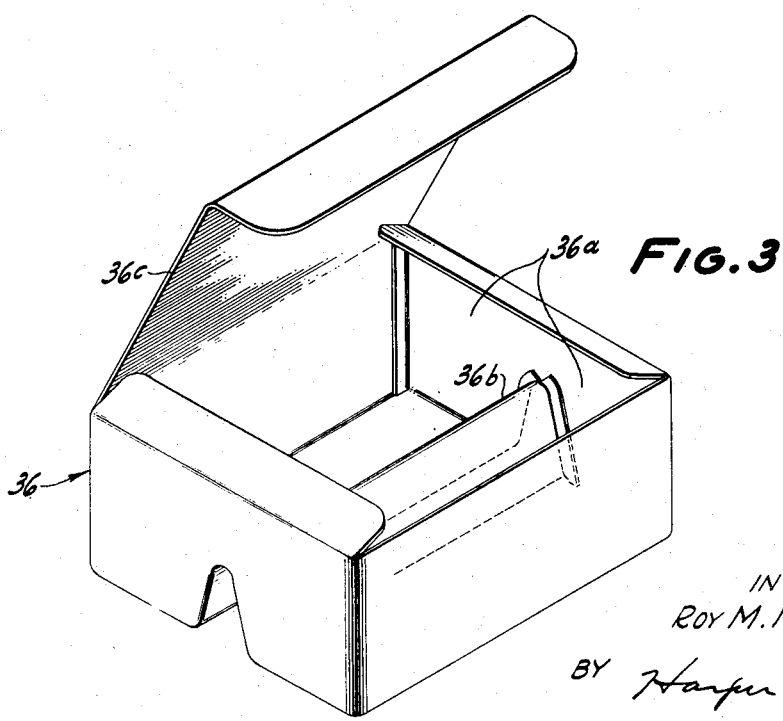
Figure 3 is a perspective view of the food package for use with the quick freeze apparatus of Figures 1 and 2.

The quick freeze tunnel 5 is constructed for cooperation with a food package 36 (Figure 3) of divided construction to provide a plurality of food compartments 36a partially separated by a rib 36b in the bottom wall of the package. As shown, the apex of the rib 36b is spaced from the lid 36c of the package, when closed, so that with the package filled with frozen food, the food in the two main food compartments is joined by a frangible food portion. If desired, the rib 36b may be increased in height to narrow or eliminate the connected frangible food portion, and, in the latter case, the two portions of frozen food are connected only by a frangible portion of the package.

Figure 2:
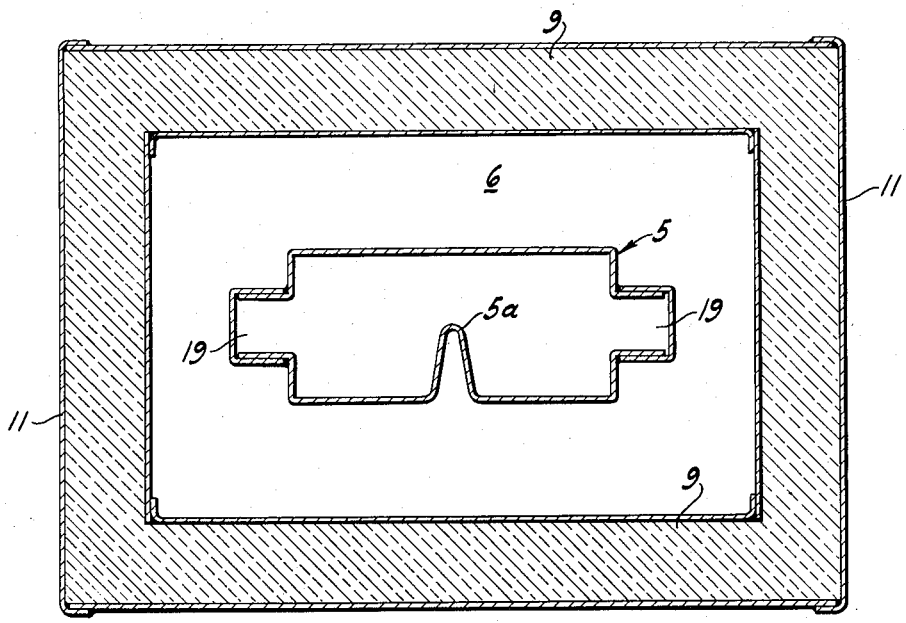
Figure 2 is a transverse sectional view of the apparatus taken as indicated by the line 2—2 in Figure 1, with the package conveying means omitted.

As seen in Figures 1 and 2, the quick freeze tunnel is provided with a longitudinal hollow V-shaped rib 5a formed integrally in the sheet metal of the bottom tunnel wall. Also, the feed ramp 31 is provided with a central rib 31a in alignment with the rib 5a so that as packages are delivered from the hopper 30 they are placed in a properly aligned relation with respect to the ribs 31a and 5a for progression through the freeze tunnel. Also, the impellers are recessed to engage over the ribs 5a and 31a.

As previously stated, it will be apparent that the various dimensions of the rib 36b in the package wall and the corresponding ribs 31a and 5a of the freezing apparatus can be varied in accordance with the desired dimensions of the frangible food connection between the two main food compartments of the package or to eliminate or substantially eliminate this connecting food portion within the package. Also, the general V-shaped contour of these ribs can be varied if desired and the number of ribs can be varied so that as many individual food compartments in the package connected by respective frangible portions of the package or the food in the package can be provided as may be desired in accordance with the food product being packaged. It will be apparent that the package and tunnel construction provide a larger proportional area of contact for heat transfer from the package to the refrigerant so that the time of freezing is reduced as compared with the time required for a conventional rectangular package containing the same amount of food material to be frozen.

While I have shown certain preferred embodiments of the invention, it will be understood that the invention is capable of variation and modification from the form shown so that its scope should be limited only by the scope of the claims appended hereto.

I claim:

1. In quick freeze apparatus for processing material in a package having a recess extending from side to side of one surface thereof, a refrigerant chamber, a freezing tunnel of fluid-tight construction of generally rectangular cross section having fluid-tight side surfaces for engagement with four outer surfaces of a rectangular package, and means in heat conducting relationship with a side surface of the tunnel for engaging said surface of the package.

2. In a quick freeze apparatus for processing material in a package having a recess extending from side to side of one surface thereof, a refrigerant chamber, a freezing tunnel defined by surrounding walls of fluid-tight construction extending through and completely encircled by said refrigerant chamber, said tunnel having a wall provided with a longitudinal rib extending inwardly of the tunnel to fit within the recess of a package disposed within the tunnel.

3. In a quick freeze apparatus for processing material in a package having a recess extending from side to side of one surface thereof, a refrigerant chamber, a freezing tunnel defined by surrounding walls of fluid-tight construction extending through and completely encircled by said refrigerant chamber, said tunnel having a wall provided with a longitudinal integrally formed rib extending inwardly of the tunnel and spaced from an opposite wall surface of the tunnel to fit within the recess of a package disposed within the tunnel, the spacing of said rib from the opposite wall surface of the tunnel providing for a frangible portion of frozen material in the package portion adjacent said recess.

4. In a quick freeze apparatus for processing material in a package having a recess extending from side to side of one surface thereof, a refrigerant chamber, a freezing tunnel defined by surrounding walls of fluid-tight construction extending through and completely encircled by said refrigerant chamber for sliding progression of packages therethrough, a wall of said tunnel having a longitudinal rib extending inwardly thereof to fit within the recess of a package disposed within the tunnel, at least another wall of said tunnel having an offset portion constituting a conveyor track extending the length of the tunnel, and a conveyor having a package propelling portion extending through said tunnel and seated on said track.

ROY M. MAGNUSON.

REFERENCES CITED

The following references are of record in the file of this patent:

UNITED STATES PATENTS

| Number | Name | Date |
| --- | --- | --- |
| 1,578,066 | Bolingbroke | Mar. 23, 1926 |
| 1,919,028 | Koppelman | July 18, 1933 |
| 1,998,431 | Birdseye | Apr. 23, 1935 |
| 2,217,392 | Wardield | Oct. 8, 1940 |
| 2,221,220 | Pack | Nov. 12, 1940 |
| 2,268,551 | McMahon | Jan. 6, 1942 |
| 2,356,110 | Waters | Aug. 15, 1944 |
| 2,466,579 | Cox | Apr. 5, 1949 |